Sept. 20, 1932.  H. SAUER  1,878,330
VEHICLE WHEEL
Filed July 30, 1931   2 Sheets-Sheet 1

Inventor
HERMAN SAUER
By Clarence A. O'Brien
Attorney

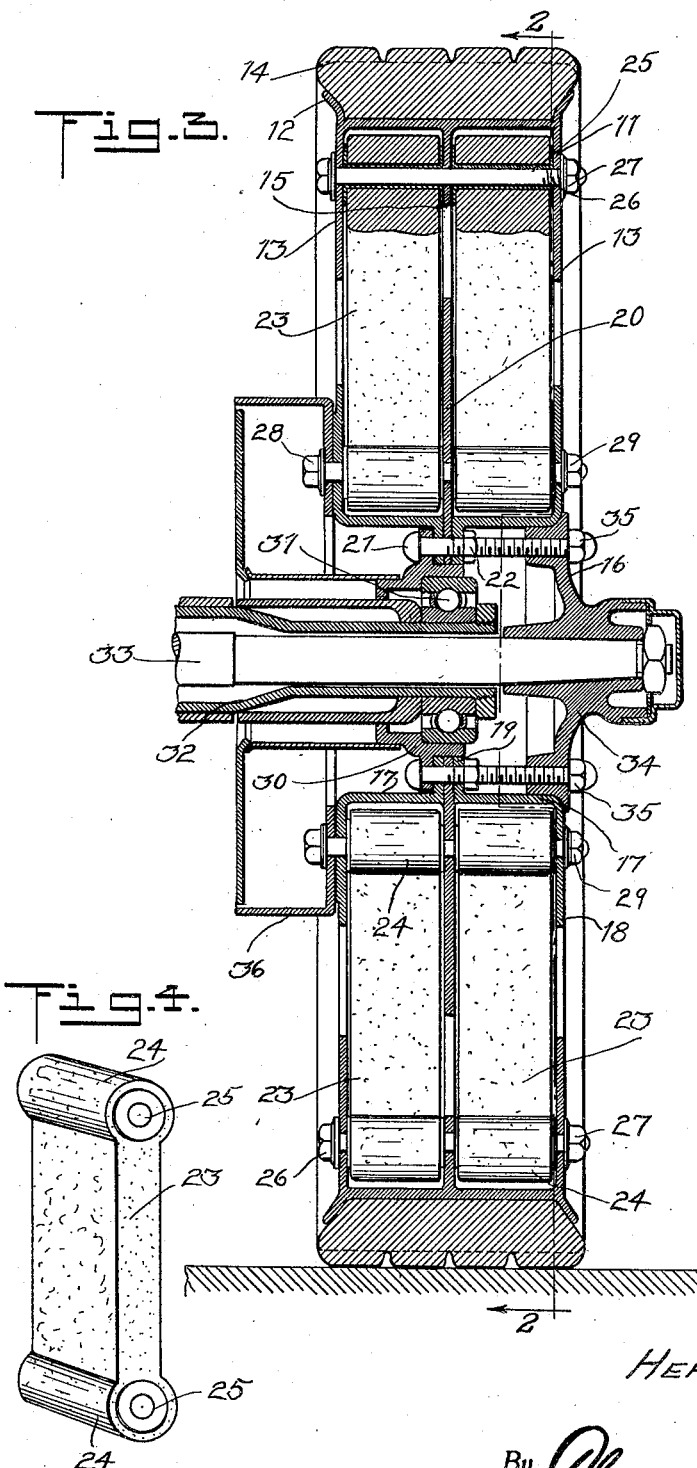

Patented Sept. 20, 1932

1,878,330

UNITED STATES PATENT OFFICE

HERMAN SAUER, OF NEW YORK, N. Y.

VEHICLE WHEEL

Application filed July 30, 1931. Serial No. 554,093.

This invention relates to improvements in vehicle wheels, and has particular reference to a resilient wheel.

The primary object of the invention resides in a vehicle wheel which will absorb any shock caused by the same passing over an uneven surface, and which would otherwise pass on to the body of the vehicle or be taken up by other shock absorbing devices.

Another object is to provide a cushion wheel constructed of a plurality of radially arranged resilient spokes which will give or yield under the weight of the load supported thereby and absorb those shocks to which loaded vehicles are subjected when in use.

A further object is to provide a resilient wheel which embodies rubber spokes, one of the ends of which are connected to a tread or rim section, while the opposite ends are connected to a hub section, the hub section being normally concentric with respect to the tread section, but yielding under a load or shock so as to move to a position eccentric with respect to the axis of the tread section, whereby the weight of the load may be said to be suspended or yieldingly supported from the rim section.

With these and other objects in view, the invention resides in the certain novel construction, combination and arrangement of parts, the essential features of which are hereinafter fully described, are particularly pointed out in the appended claim, and are illustrated in the accompanying drawings, in which:—

Figure 3 is a vertical transverse sectional view on the line 3—3 of Figure 1.

Figure 4 is a detail perspective view of one of the resilient spokes per se.

Figure 1:
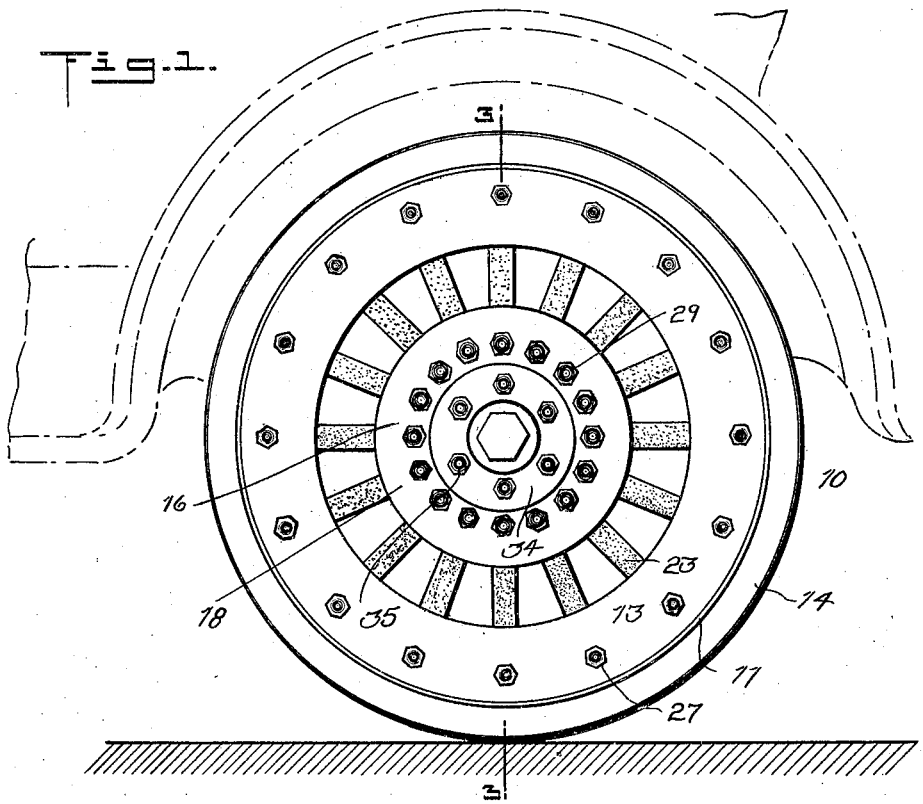
Figure 1 is a side elevational view of my improved resilient wheel in normal position.

Referring to the drawings by reference characters, the numeral 10 designates my improved resilient wheel in its entirety which includes an outer rim section 11 provided with outwardly extending tire engaging flanges 12 and inwardly extending annular side flanges 13. The flanges 12 serve to hold a rubber tire 14 to the rim, and provide a tread for the wheel 10. Also extending inwardly from the rim section 11 and disposed intermediate the side flanges 13, is an intermediate flange 15 which divides the space between the side flanges 13 into two separate annular pockets for a purpose to be presently explained.

Associated with the rim section 11 and normally disposed concentric with respect to the axis of the rim section, is a hub section 16, the same including a pair of annular hub rings 17, each of which is provided with an outwardly extending annular flange 18 at the outer side thereof, while the inner side of each ring 17 is provided with an inwardly extending annular flange 19. The flanges 19 are disposed adjacent each other, but interposed therebetween and extending outwardly from the hub section is a disc or annular plate 20, the same being disposed in the same plane as the intermediate flange 15 of the rim section 11. Bolts 21 pass through the flanges 19 and through the disc or plate 20, while nuts 22 serve to hold the parts in an assembled position. The side flanges 18 of the annular ring members 17 are disposed in the same plane as the side flanges 13 of the rim section 11, but terminate in spaced relation with respect thereto to facilitate the movement of the hub section with respect to the outer rim section.

The side flanges 18 and the annular plate or disc 20 coact to divide the hub section into separate annular pockets which are in alignment with the pockets formed in the rim section and hereinbefore mentioned. Disposed within the pockets formed by the dividing plate or disc 20 and flange 15, are sets of resilient spokes 23 each of which comprises a flat body constructed of rubber and provided with enlarged portions 24 at opposite ends thereof. Extending transversely through the enlarged portions 24 are bearing openings which receive spool-like brass bearing members 25, the tubular portion of the bearing members passing through the bearing openings while the flanges at the opposite ends thereof abut the opposite sides of the enlarged portions 24. These spokes are constructed of hard rubber, but are of sufficient resiliency as to flex under weight or stress. The spokes 23 are radially arranged within the circumferential pockets and passing through the bearings 25 at the outer end of the spokes, are pivot bolts 26, the said bolts also passing through the side flanges 13 and the intermediate flange 15. Securing nuts 27 are threaded to the free ends of the bolts for securing the same in position. Passing through the inner ends of the sets of spokes 23 and through the flanges 18 and disc 20 are pivot bolts 28, the free ends of which are threaded to receive retaining nuts 29.

Secured to the inner ring member 17 by the bolt 21 is a bearing member 30 which is supported by a ball or roller bearing 31 mounted on the outer end of an axle housing 32 through which the axle 33 extends. The outer end of the axle 33 receives a hub cap plate 34 through which the bolts 21 extend, while nuts 35 are threaded to the extreme free end of the said bolt to secure the hub plate in position against the outer annular ring member 17. Secured to the inner ring member 17 is a brake drum 36 of any conventional construction and which is held in position by the bolts 28.

Figure 2:
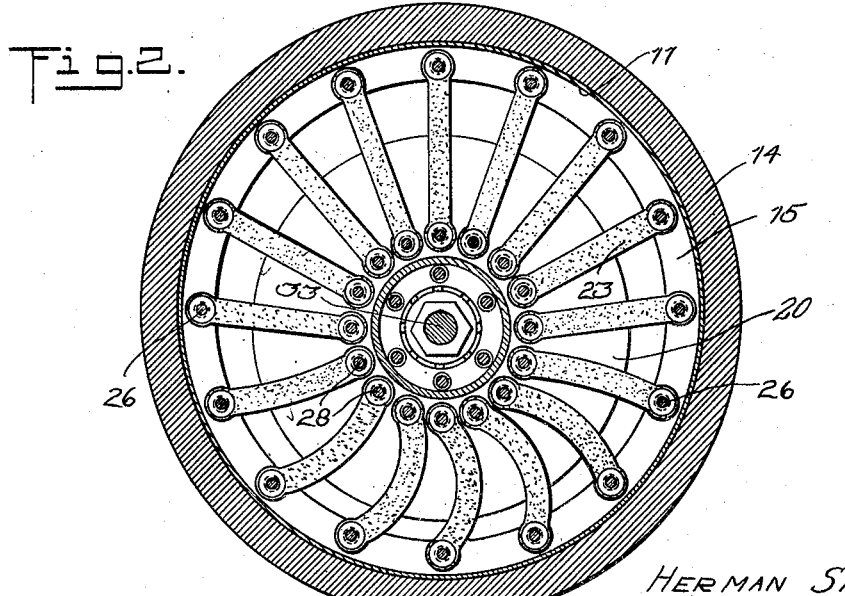
Figure 2 is a vertical circumferential sectional view showing the wheel in a position when under a load or subjected to a shock and taken on the line 2—2 of Figure 3.

From the foregoing description, it will be seen that I have provided a resilient wheel which under normal conditions resembles an ordinary vehicle wheel as shown in Figure 1 of the drawings. That is, the same consists of a hub section, and an outer rim section with spokes connecting the two. However, under a load or when subjected to a shock, the wheel assumes a position somewhat similar to that shown in Figure 2 as the load or shock will tend to flex certain of the spokes disposed below the horizontal axis of the hub section and will in turn tend to stress certain of the spokes disposed above the horizontal axis of the hub section. This flexing and stressing of the spokes causes the hub section to be moved to a position eccentric with respect to the axis of the rim or tread section, but as soon as the load or shock is released from the hub section, the same assumes its normal position, that is a position concentric with respect to the outer rim or tread section. This flexing and stretching of the spokes tends to absorb any shock which will be subjected to the wheel during the passage of the same over an uneven road surface.

Although I have shown a wheel constructed for use upon automobiles and trucks, it will be understood that the principle of my invention may be embodied in wheels for various other types of vehicles such as wheel barrows, wagons, and like wheels for railroad and trolley service.

While I have shown and described what I deem to be the most desirable embodiment of my invention, it will be understood that various changes may be resorted to as come within the scope of the appended claim.

Having thus described the invention, what I claim as new and desire to secure by Letters Patent is:—

A resilient wheel comprising an annular rim section having side flanges, and an intermediate flange, a hub section including a pair of annular ring members having opposed inwardly and outwardly extending flanges, the outwardly extending flanges being in alinement with the side flanges of said rim section, an annular plate interposed between said inwardly extending flanges, securing elements passing through said inwardly extending flanges and plate, said plate being in alinement with said intermediate flange, seats of spaced radially extending resilient spokes, and inner and outer sets of bolts, the outer set of bolts passing through said side flanges, said intermediate flange and the outer ends of said spokes, while the inner set of bolts extend through said outwardly extending flanges, annular plate and the inner ends of said resilient spokes.

In testimony whereof I affix my signature.

HERMAN SAUER.